(12) United States Patent
Soubramanien

(10) Patent No.: US 7,873,656 B1
(45) Date of Patent: Jan. 18, 2011

(54) APPARATUS AND METHODS TO REDUCE PROXY OVERHEAD IN A GATEWAY

(75) Inventor: Viswa Soubramanien, Santa Clara, CA (US)

(73) Assignee: Trend Micro Incorporated, Tokyo (JP)

( * ) Notice: Subject to any disclaimer, the term of this patent is extended or adjusted under 35 U.S.C. 154(b) by 461 days.

(21) Appl. No.: 11/861,203

(22) Filed: Sep. 25, 2007

(51) Int. Cl.
 G06F 17/30 (2006.01)
 G06F 7/00 (2006.01)
(52) U.S. Cl. ............ 707/770; 707/716; 707/781; 707/966; 709/203; 709/226; 711/113; 711/118
(58) Field of Classification Search .................. None
 See application file for complete search history.

(56) References Cited

U.S. PATENT DOCUMENTS 6,687,739 B2 * 2/2004 Anupam et al. ............. 709/204
2003/0005084 A1 * 1/2003 Humphrey ................. 709/218
2006/0101514 A1 * 5/2006 Milener et al. .............. 726/22
2007/0209005 A1 * 9/2007 Shaver et al. ............... 715/733

* cited by examiner

Primary Examiner—Greta L Robinson
Assistant Examiner—James J Wilcox
(74) Attorney, Agent, or Firm—IP Strategy Group, P.C.

(57) ABSTRACT

An arrangement within a gateway for evaluating a Uniform Resource Locator (URL) request. The gateway is configured to be organized into at least a kernel space and an application space during operation. The one or more drivers are configured to reside within the kernel space of the gateway and configured to perform at least intercepting the URL request and querying at least an information service. The querying is also configured to obtain information attributed to a URL that is associated with said URL request.

13 Claims, 2 Drawing Sheets

APPARATUS AND METHODS TO REDUCE PROXY OVERHEAD IN A GATEWAY

BACKGROUND OF THE INVENTION

The Internet is a worldwide, publicly accessible network of interconnected computer networks, which has long been employed by users for data management, communication, purchasing goods, sharing, searching, etc. As the Internet continues to evolve, the risk of users being vulnerable to malicious websites and/or inappropriate and/or unwanted content also increases. Therefore, detecting these malicious websites and/or inappropriate and/or unwanted content more efficiently and intelligently is a critical task for individuals and organizations alike.

One technique to detect malicious websites and/or inappropriate and/or unwanted content involves the utilization of web gateway appliances. A web gateway appliance may function as a relay between one or more users and the Internet in order to help inhibit an attacker from invading, for example, the user's computer or network, which may cause an immense amount of damage to the user.

Consider the situation wherein, for example, all Uniform Resource Locator (URL) requests from the user to the Internet are first intercepted by a web gateway appliance before connections to the Internet are allowed or disallowed. The web gateway appliance may act as a "traffic cop" and evaluate each web access request. The web gateway appliance evaluates each web access request by making a connection to, for example, Trend Micro's Web Reputation Service (WRS) or another URL or rating/scoring/malware detection service, in order to receive a rating or score for the URL. Once the URL rating or score is evaluated, the web access request is then either allowed or denied. If the web gateway appliance allows the request, the web gateway appliance then permits or enables the user to connect to the Internet for that particular web access request. On the other hand, if the web gateway appliance disallows the web access request, the web gateway appliance would then transmit back to the user a warning and/or a denial of access for that particular web access request.

Unfortunately, each time the web gateway appliance intercepts a request from the user, resources have to be allocated from the gateway's application space to facilitate the evaluation task. Likewise, when the web gateway appliance makes a connection with, for example, web reputation service and to the destination server, resources have to also be allocated from the gateway's application space to manage the connection. Therefore, for each web access request made by the user, two or more connections have to be made, and each time a connection is made resources are allocated from the gateway's application space. By tying up too much of the resources from the gateway's application space or even possibly all of the application space resources, the web gateway could slow down and/or limits its ability to service additional new connections, resulting in an inability to timely service web access requests. In severe cases, the user could be denied access to any website due to gateway congestion.

In view of the foregoing, improved solutions for detecting malicious websites or inappropriate and unwanted content are desired.

SUMMARY OF INVENTION

The invention relates, in an embodiment, to an arrangement within a gateway for evaluating a Uniform Resource Locator (URL) request. The gateway is configured to be organized into at least a kernel space and an application space during operation. The one or more drivers are configured to reside within the kernel space of the gateway and configured to perform at least intercepting the URL request and querying at least an information service. The querying is also configured to obtain information attributed to a URL that is associated with said URL request.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
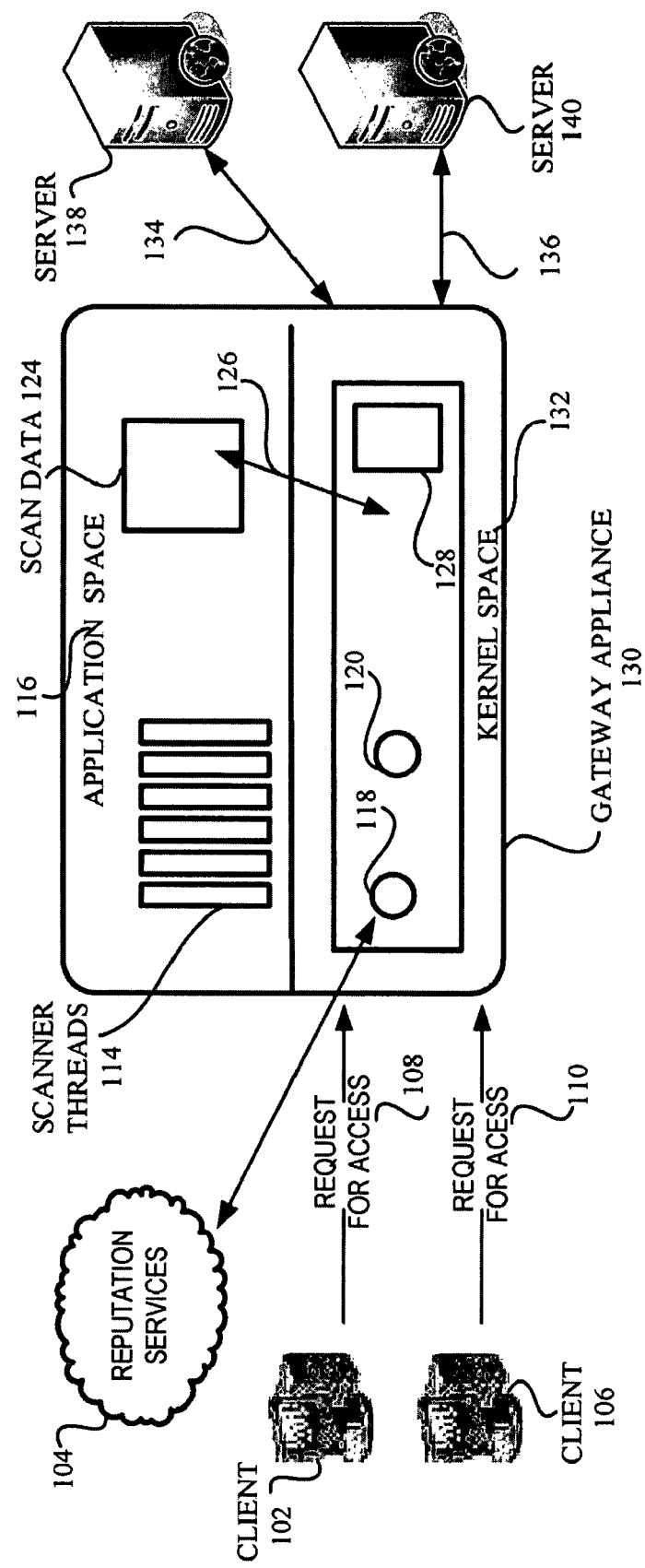
FIG. 1 shows, in accordance with one or more embodiments of the invention, a block, diagram of an arrangement for reducing proxy overhead in a gateway.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Embodiments of the invention relate to apparatus and methods to reduce proxy overhead on gateway products. In one or more embodiments, the invention employs one or more drivers in the gateway's kernel space of a web gateway in order to ascertain whether a web access request (e.g., a URL request) is safe or is unsafe, or whether the web access needs to undergo additional scanning by the gateway's application space.

In one or more embodiments of the invention, after a user initiates a web access request, a driver within the gateway's kernel space intercepts the web access request and executes an evaluation of the web access request. During this evaluation, the kernel space driver may query various sources, for example, internet-based services such as web reputation services that is accessible through the internet, in order to acquire information regarding the URL in question. The information acquired by the kernel space driver may be a safe/unsafe rating, categorization data, score attributed to that particular URL, ownership information of the website associated with that URL, etc. The information obtained is referred to generically herein as "rating information" or "rating data" although it should be clear from the above that the term "rating information" or "rating data" as employed herein is not limited solely to safe/unsafe rating information.

Once the rating data for the URL is received by the kernel space driver, a decision is then made regarding whether the URL is safe or unsafe or whether the URL needs to undergo additional scanning and/or analysis. The decision may be performed by either the kernel space driver or an application space application.

If the URL is deemed unsafe, the kernel space driver may simply deny the access request. If the URL is deemed safe, the kernel space driver may pass the web access request transparently through the web gateway appliance to the Internet to permit access without using the gateway's application space resources for additional scanning.

On the other hand, if the web access request needs to undergo additional scanning and/or analysis, the kernel space driver may transmit the URL-related data, which may include the URL and rating data obtained (if any), to applications executing in the gateway's application space for further processing (e.g., scanning).

In one or more embodiments of the invention, a kernel space driver, which may be the same kernel space driver that performs the intercepting and/or querying, may be employed to perform other tasks related to the web access request. For example, this kernel space driver may mark sessions and create local table entries for URLs for connections made. By marking the sessions and creating local table entries, queries associated with a given URL may be eliminated if that URL is found in the safe website database, i.e., the database where URLs deemed to be safe are tracked. The kernel space driver may, additionally or alternatively, perform local caching of URL-related rating data.

By employing the gateway's kernel driver(s) to intercept access requests, to execute queries to ascertain the safety of access requests, and/or to perform permit/deny or additional processing on access requests at the kernel space, fewer resources are required from the gateway's application space. As a result, the gateway's application space resources are not overwhelmed, and the gateway appliance or server may be able to handle additional connections and execute a lot faster as a whole. As such, access requests are serviced more rapidly, and the probability of false denials to safe websites due to gateway congestion may be reduced.

The features and advantages of the invention may be better understood with reference to the figures and discussions that follow. FIG. 1 shows, in accordance with an embodiment of the present invention, a block diagram of some of the components that are employed to reduce proxy overhead on gateway products.

In FIG. 1, there are shown client computers 102 and 106, a gateway appliance (130) including a gateway's application space (116) and a gateway's kernel space (132), web reputation service (104), and servers 138 and 140. With reference to FIG. 1, client computer 102 initiates a request 108 for web access. For example, client computer 102 may want to access a website that is hosted by server 138. Once client computer 102 initiates request 108, request 108 is then intercepted by a driver 118 within gateway's kernel space 132 of gateway appliance 130. However, the kernel space driver 118 does not automatically allow access to the destination website, for example, the destination website hosted on server 138. Instead, the first kernel space driver 118 queries a web reputation service (104) for rating data. The query may involve forwarding to web reputation service 104 the URL of the destination website (for example, www.google.com).

After kernel space driver 118 queries web reputation service (104), web reputation service (104) then transmits back rating data regarding the webpage/website to which the access request pertains. Note that a web reputation service is employed in this example although any service capable of providing rating information for an access request may be employed. The query may be directed at one or more of such services to obtain information useful or necessary to evaluate an access request.

Once the rating data has been received by the kernel space driver 118, a decision is then made to either allow or deny access to the destination website or to transmit (126) the URL-related data to the gateway's application space (116) for additional scanning if the web access request pertains to a website that may potentially be malicious or unsafe.

It should be noted that in some cases, a local data store (not shown), representing a local rating cache that is local to the gateway (i.e., implemented on the same chassis or very close by or is coupled to the gateway in a manner that permits fast access by the gateway) may be provided. If such local rating cache is employed, rating information received from the web reputation service may be cached locally to facilitate the evaluation of subsequently submitted URLs. This caching function may be performed by a kernel space driver or primarily out of kernel space resources, in one or more embodiments. If a subsequent URL is received by the gateway, the local rating cache may be checked first, in one or more embodiments, This cache checking function may also be performed by a kernel space driver or primarily out of kernel space resources, in one or more embodiments. If a cache hit occurs, the cached data may be employed to decide whether to permit or deny access. If a cache miss is experienced, that URL is then forwarded to the web reputation service to obtain the rating data. The rating data in the local rating cache may be refreshed from time to time or may be allowed to expire, in one or more embodiments, to ensure that URLs are evaluated with current rating data.

As mentioned earlier, if the web access request is deemed safe, kernel space driver 118 may pass (136 or 134) the URL-related data transparently through the gateway appliance to the Internet to enable access to the destination website without utilizing the gateway's application space resources for additional scanning.

However, if the web access request is deemed to be potentially unsafe, the kernel space driver may pass the URL-related data, which may include the URL and received rating information (if any), on to a scanning application (124) within the gateway's application space (116). Once the URL-related data has been passed (126) on to the scanning application within the gateway's application space (116), the scanning application (124) may employ any number of malware or content scanning applications and/or plug-ins to scan the URL-related data and/or scan/evaluate the website or webpage associated with the access request. One or more scanner threads (114) in the gateway's application space may be employed to scan the URL-related data.

As shown in FIG. 1, the kernel space driver may also mark, in one or more embodiments, the sessions and creates local table entries (128) for connections made. By marking the sessions and creating local table entries (128) for connections made, further queries may be eliminated if a subsequently received URL is found to be associated with a safe website database (e.g., the local cache or any other data store that is employed to track URLs known to be safe).

It should be noted that thus far, the discussion has involved a single kernel space driver (e.g., kernel space driver 118) to perform the tasks of intercepting, querying, decision-making, further analysis, etc related to an access request. It should be understood, however, that multiple kernel space drivers may be employed, and the aforementioned tasks may be delegated in any manner among one or more kernel space drivers. A second kernel space driver 120 is shown in FIG. 1 to signify that more than one kernel space driver may be employed if desired.

Figure 2:
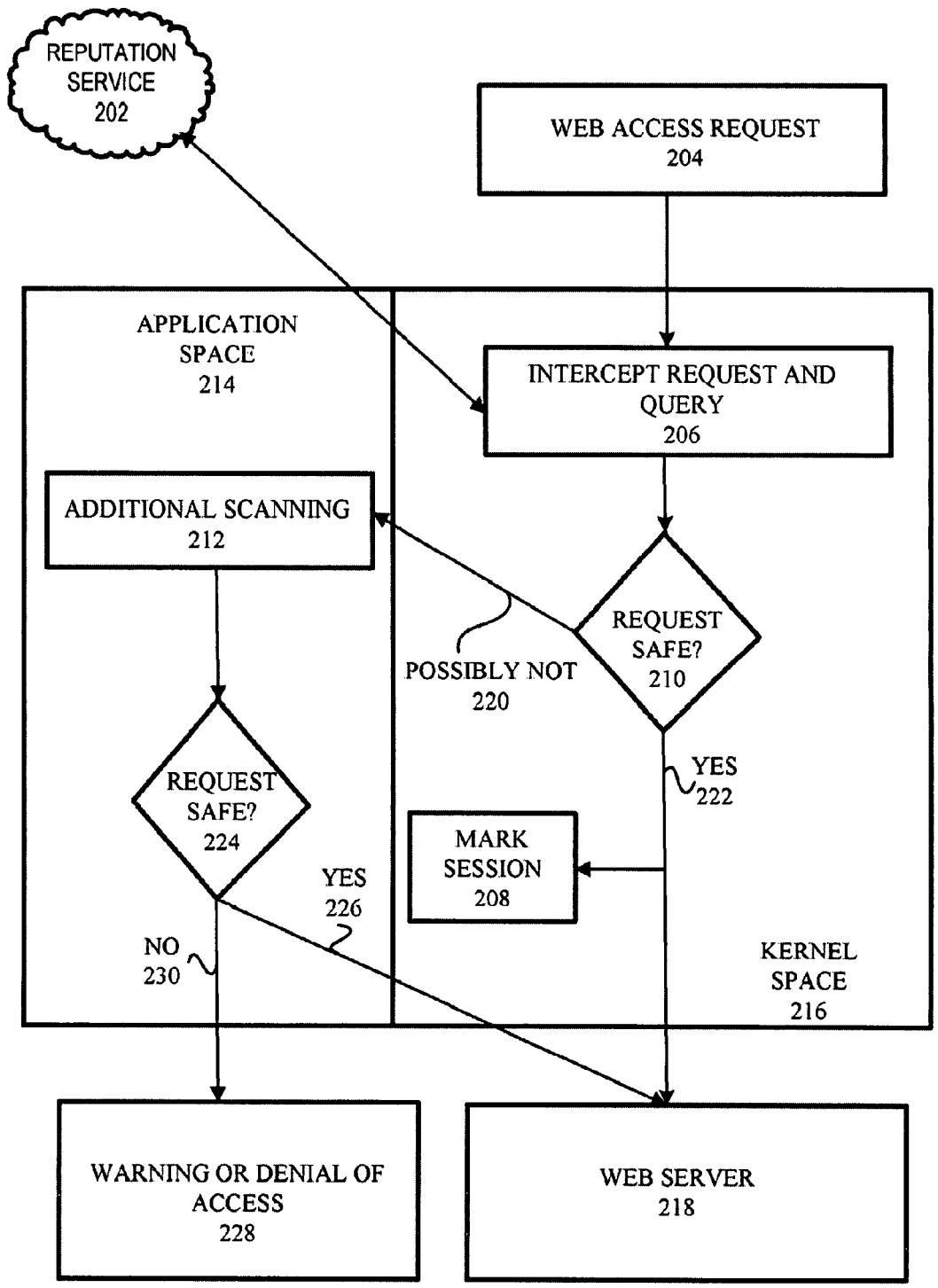
FIG. 2 shows, in accordance with one or more embodiments of the invention, a flow diagram of the relevant steps for reducing proxy overhead in a gateway.

FIG. 2 is a flowchart illustrating, in accordance with one or more embodiments of the present invention, some of the method steps for achieving proxy overhead reduction in gateway products. With reference to FIG. 2, the first step comprises of a user (or some software) initiating a web access request (204). For example, the user may want to access a destination website, e.g., www.google.com. As mentioned earlier, access to the destination website does not automatically occur once the user initiates a web access request (204).

After the user initiates the access request (204), the access request is then intercepted and queried (206) using one or more kernel-space drivers within the gateway's kernel space (216). These kernel space drivers may query, for example, reputation service (202).

Reputation service (202) then transmit back to the requesting kernel space driver rating data pertaining to the access request. As mentioned earlier, this requested rating information may include but is not limited to malicious or non-malicious rating/scores for the URL associated with the access request (204).

Furthermore, once the rating data is received by the kernel space driver, a decision is then made (210) regarding whether the access is safe or is unsafe or whether the access request needs to undergo additional scanning. If the access is deemed safe (222), the kernel space driver enables access to the web server (218) without using the gateway's application space resources for additional scanning.

As discussed earlier, if the access is deemed to be safe (222), a kernel space driver may then mark (208) the session and create local table entries for the connection made. By marking the sessions and creating local table entries for connections made, the necessity for making another query may be eliminated if a subsequent web access request pertains to a URL that is found already associated with the "safe" website database.

On the other hand, if the web access request is deemed potentially unsafe (220), that web access request may need to undergo additional scanning. In this case, a kernel space driver, which may be the same kernel space driver that performed the intercepting and/or querying or another kernel space driver, may transmit the URL-related data to the gateway's application space (214) for additional processing, such as scanning (212). Once the URL-related data has been transmitted to the gateway's application space (214), additional processing such as scanning may be performed in order to determine whether the URL is safe or unsafe.

If the URL is deemed safe at this stage (226), one or more applications in the gateway's application space (214) would then enable the user to connect to the web server (218) associated with that particular web access request (204). On the other hand, if the URL is deemed to be unsafe (230), an application in the gateway's application space (214) would then transmit back to the user either a warning or a denial of access (228) for that particular web access request (204). Although not shown in FIG. 2, if the determination in step 210 results in a decision that the web access is simply unsafe, a rejection may be made immediately without requiring the additional processing (212) by applications in the application space.

As mentioned earlier, by employing the gateway's kernel space to intercept web access requests and/or to run queries to ascertain the safety of web access requests and/or to perform other tasks regarding web access request evaluation at kernel space, fewer resources need to be allocated in the gateway's application space (214). As a result, the gateway's application space resources are not overwhelmed, and the gateway appliance or server may be able to handle additional connections and execute a lot faster as a whole. As such, access requests are serviced more rapidly, and the probability of false denials to safe websites due to gateway congestion may be reduced.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A gateway appliance for use in an arrangement for evaluating a Uniform Resource Locator (URL) request, said gateway appliance including at least a kernel space and an application space during operation, said gateway appliance comprising:

one or more drivers residing within said kernel space of said gateway appliance and configured to perform at least intercepting said URL request, said URL request being initiated by a client device and being addressed to a server device, said gateway appliance being a computing device coupled between said client device and said server device, said gateway appliance being external to said client device and being external to said server device, and querying at least an information service to obtain information attributed to a URL that is associated with said URL request, wherein said information service includes at least an Internet-based service capable of providing said information attributed to said URL and a local data store configured to cache said information attributed to said URL, said querying first queries said local data store, and if a cache miss is experienced, at least a portion of said URL is passed to said internet-based service to obtain said information attributed to said URL and wherein said one or more drivers are configured to pass said URL request through said gateway appliance without utilizing said application space to evaluate said URL request if said URL request is deemed safe from said information attributed to said URL, thus enabling a connection to a webpage represented by said URL; and a computer readable medium, wherein said one more drivers are stored in said computer readable medium.

2. The gateway appliance of claim 1 wherein said one or more drivers includes at least a first driver and a second driver, said first driver configured to perform at least said intercepting said URL request and said querying said information service, and one of said first driver and said second driver configured to perform evaluating said information attributed to said URL.

3. The gateway appliance of claim 2 wherein said second driver is configured to create an entry in a local table for a connection to a webpage represented by said URL if said URL request is deemed safe from said information attributed to said URL, said local table being located in said kernel space of said gateway appliance.

4. The gateway appliance of claim 2 wherein said second driver is configured to pass said information attributed to said URL to a scanning application within said application space if said URL request is determined to be other than safe.

5. The gateway appliance of claim 1 wherein said information service includes at least an Internet-based service capable of providing said information attributed to said URL.

6. The gateway appliance of claim 1 wherein said information service includes at least a local data store, said local data store configured to cache said information attributed to said URL.

7. In a gateway, a method for evaluating a Uniform Resource Locator (URL) request, said method comprising:

intercepting said URL request using one or more drivers residing within a kernel space in said gateway, said one or more drivers being stored in a computer readable medium, said URL request being initiated by a client device and being addressed to a server device, said gateway being a computing device coupled between said client device and said server device, said gateway being external to said client device and being external to said server device; and performing a query, using said one or more drivers, of at least an information service, said query configured to obtain information attributed to a URL that is associated with said URL request, wherein said information service includes at least an Internet-based service capable of providing said information attributed to said URL and a local data store configured to cache said information attributed to said URL, said performing said query first queries said local data store, and if a cache miss is experienced, at least a portion of said URL is passed to said internet-based service to obtain said information attributed to said URL and wherein said one or more drivers are configured to pass said URL request through said gateway without utilizing an application space in said gateway to evaluate said URL request if said URL request is deemed safe from said information attributed to said URL, thus enabling a connection to a webpage represented by said URL.

8. The method of claim 7 wherein said one or more drivers includes at least a first driver and a second driver, said first driver configured to perform at least said intercepting said URL request and said querying said information service, said method further comprising evaluating, using one of said first driver and said second driver, said information attributed to said URL.

9. The method of claim 8 further comprising creating, using said second driver, an entry in a local table in said kernel space in said gateway for a connection to a webpage represented by said URL if said URL request is deemed safe from said information attributed to said URL.

10. The method of claim 8 further comprising passing, using said second driver, said information attributed to said URL to a scanning application within said application space if said URL request is determined to be other than safe.

11. A method for preparing a gateway for use in evaluating a Uniform Resource Locator (URL) request, said method comprising:

providing a kernel space in said gateway;

implementing one or more drivers in said kernel space, said one or more drivers being stored in a computer readable medium; and configuring said one or more drivers to intercept said URL request, said URL request being initiated by a client device and being addressed to a server device, said gateway being a computing device coupled between said client device and said server device, said gateway being external to said client device and being external to said server device;

configuring said one or more drivers to query at least an information service, said query configured to obtain information attributed to a URL that is associated with said URL request, wherein said information service includes at least an Internet-based service capable of providing said information attributed to said URL and a local data store configured to cache said information attributed to said URL, said query by said one or more drivers first queries said local data store, and if a cache miss is experienced, at least a portion of said URL is passed to said internet-based service to obtain said information attributed to said URL and wherein said one or more drivers are configured to pass said URL request through said gateway without utilizing an application space of said gateway to evaluate said URL request if said URL request is deemed safe from said information attributed to said URL, thus enabling a connection to a webpage represented by said URL.

12. The method of claim 11 further comprising providing a data store, said data store configured to cache information attributed to a URL that is associated with said URL request.

13. The method of claim 11 further comprising providing a local table in said kernel space in said gateway, said local table configured to cache information attributed to a connection to a webpage represented by a URL that is associated with said URL request.

* * * * *